(12) United States Patent
Viegas et al.

(10) Patent No.: US 10,351,042 B2
(45) Date of Patent: Jul. 16, 2019

(54) HYBRID TEMPERATURE CONTROL SYSTEM AND METHOD

(71) Applicant: THERMO KING CORPORATION, Minneapolis, MN (US)

(72) Inventors: Herman H. Viegas, Bloomington, MN (US); Samvit Dutta, Galway (IE)

(73) Assignee: THERMO KING CORPORATION, Minneapolis, MN (US)

( * ) Notice: Subject to any disclaimer, the term of this patent is extended or adjusted under 35 U.S.C. 154(b) by 710 days.

(21) Appl. No.: 14/900,066

(22) PCT Filed: Jun. 18, 2014

(86) PCT No.: PCT/US2014/042895
§ 371 (c)(1),
(2) Date: Dec. 18, 2015

(87) PCT Pub. No.: WO2014/205051
PCT Pub. Date: Dec. 24, 2014

(65) Prior Publication Data
US 2016/0144765 A1    May 26, 2016

Related U.S. Application Data

(60) Provisional application No. 61/836,424, filed on Jun. 18, 2013.

(51) Int. Cl.
*B60H 1/00* (2006.01)
*F25B 1/00* (2006.01)
(Continued)

(52) U.S. Cl.
CPC ............... *B60P 3/20* (2013.01); *B60H 1/005* (2013.01); *B60H 1/00014* (2013.01);
(Continued)

(58) Field of Classification Search
CPC ....... B60P 3/20; B60H 1/00014; B60H 1/005; F25B 2400/24; F25B 19/005
See application file for complete search history.

(56) References Cited

U.S. PATENT DOCUMENTS 2,744,388 A * 5/1956 Kleist ................ B61D 27/0081
62/125
2,875,595 A    3/1959 Kleist
(Continued)

FOREIGN PATENT DOCUMENTS

| CN | 1492195 | 4/2004 |
| CN | 101002062 U | 8/2007 |

(Continued)

OTHER PUBLICATIONS

Machine Translation of DE102011014746 (Year: 2019).*
(Continued)

*Primary Examiner* — Orlando E Aviles
(74) *Attorney, Agent, or Firm* — Hamre, Schumann, Mueller & Larson, P.C.

(57) ABSTRACT

A transport refrigeration system (TRS) for refrigeration of a transport unit is disclosed. The TRS includes an eutectic device, including an eutectic medium, connected to a refrigerant circuit and a cooling fluid circuit. A method for cooling with the eutectic device is also disclosed. The eutectic device including the eutectic medium is cooled with one or both of the cooling fluid circuit and/or the refrigerant circuit. The refrigerant circuit directs a refrigerant from a transport refrigeration unit.

20 Claims, 1 Drawing Sheet

(51) Int. Cl.
*F25B 19/00* (2006.01)
*B60H 1/32* (2006.01)
*B60P 3/20* (2006.01)

(52) U.S. Cl.
CPC ....... *B60H 1/00378* (2013.01); *B60H 1/3232* (2013.01); *F25B 1/00* (2013.01); *F25B 19/005* (2013.01); *F25B 2400/24* (2013.01); *F25B 2700/21* (2013.01)

(56) References Cited

U.S. PATENT DOCUMENTS

| | | |
|---|---|---|
| 3,006,167 A | 10/1961 | Lorch |
| 3,156,101 A | 11/1964 | Mcguffey |
| 3,159,982 A | 12/1964 | Schachner |
| 3,633,381 A | 1/1972 | Haaf et al. |
| 3,744,271 A | 7/1973 | Franklin |
| 3,788,093 A | 1/1974 | Lauterbach |
| 3,845,638 A | 11/1974 | Apple et al. |
| 4,658,593 A | 4/1987 | Stenvinkel |
| 4,712,387 A | 12/1987 | James et al. |
| 4,719,028 A | 1/1988 | James et al. |
| 4,856,285 A | 8/1989 | Acharya et al. |
| 5,239,839 A | 8/1993 | James |
| 5,272,887 A | 12/1993 | Zendzian, Sr. |
| 5,548,967 A | 8/1996 | Ghiraldi |
| 5,553,662 A | 9/1996 | Longardner et al. |
| 5,561,986 A | 10/1996 | Goodall |
| 5,870,897 A * | 2/1999 | Barr ................. F25D 3/105 62/434 |
| 6,059,016 A | 5/2000 | Rafalovich et al. |
| 6,062,030 A | 5/2000 | Viegas |
| 6,327,871 B1 | 12/2001 | Rafalovich |
| 6,378,319 B1 | 4/2002 | Mani |
| 6,408,640 B1 | 6/2002 | Garrett et al. |
| 6,543,245 B1 | 4/2003 | Waldschmidt et al. |
| 6,609,382 B2 | 8/2003 | Vanderwoude et al. |
| 6,631,621 B2 | 10/2003 | Vanderwoude et al. |
| 6,688,120 B2 | 2/2004 | Aoki et al. |
| 6,698,212 B2 | 3/2004 | Viegas et al. |
| 6,751,966 B2 | 6/2004 | Viegas et al. |
| 7,043,931 B2 | 5/2006 | Plummer |
| 7,089,756 B2 | 8/2006 | Hu |
| 7,124,594 B2 | 10/2006 | McRell |
| 7,162,878 B2 | 1/2007 | Narayanamurthy |
| 7,174,736 B2 | 2/2007 | Chen et al. |
| 7,363,772 B2 | 4/2008 | Narayanamurthy |
| 7,421,846 B2 | 9/2008 | Narayanamurthy et al. |
| 7,503,185 B2 | 3/2009 | Narayanamurthy et al. |
| 7,690,212 B2 | 4/2010 | Narayanamurthy et al. |
| 7,793,515 B2 | 9/2010 | Narayanamurthy |
| 7,827,807 B2 | 11/2010 | Narayanamurthy et al. |
| 7,854,129 B2 | 12/2010 | Narayanamurthy |
| 7,891,211 B2 | 2/2011 | Aikawa |
| 8,042,352 B2 | 10/2011 | DeAngelis |
| 8,082,743 B2 | 12/2011 | Hermann et al. |

| | | |
|---|---|---|
| 2002/0129613 A1 | 9/2002 | Viegas et al. |
| 2002/0162342 A1 | 11/2002 | Weng et al. |
| 2002/0174666 A1 * | 11/2002 | Viegas ................. B60H 1/3205 62/131 |
| 2003/0019219 A1 | 1/2003 | Viegas et al. |
| 2003/0019224 A1 | 1/2003 | Woude et al. |
| 2004/0216469 A1 | 11/2004 | Viegas et al. |
| 2006/0137374 A1 | 6/2006 | Chen et al. |
| 2006/0196215 A1 | 9/2006 | Crumlin et al. |
| 2007/0131782 A1 | 6/2007 | Ziehr et al. |
| 2008/0011007 A1 | 1/2008 | Larson et al. |
| 2008/0087029 A1 | 4/2008 | Renken et al. |
| 2009/0272132 A1 | 11/2009 | Rusignuolo et al. |
| 2010/0180614 A1 | 7/2010 | Larson et al. |
| 2011/0061410 A1 | 3/2011 | Narayanamurthy |
| 2011/0162829 A1 | 7/2011 | Xiang |
| 2011/0254690 A1 | 10/2011 | Perten et al. |
| 2012/0000212 A1 | 1/2012 | Sanders et al. |
| 2012/0055180 A1 | 3/2012 | Larson et al. |

FOREIGN PATENT DOCUMENTS

| | | | |
|---|---|---|---|
| CN | 101021348 | 8/2007 | |
| CN | 101457964 | 6/2009 | |
| CN | 101508263 A | 8/2009 | |
| CN | 201427542 Y | 3/2010 | |
| CN | 201932065 | 8/2011 | |
| CN | 201932065 U | 8/2011 | |
| CN | 102958751 | 3/2013 | |
| DE | 19907250 | 8/2000 | |
| DE | 102006016557 | 10/2007 | |
| DE | 102007015391 | 10/2008 | |
| DE | 102011014746 A1 * | 9/2012 | ............ B60H 1/323 |
| FR | 2284839 | 4/1976 | |
| GB | 2383839 | 9/2003 | |
| JP | 2004333112 | 11/2004 | |
| WO | 2006007663 | 1/2006 | |
| WO | 2008116722 | 10/2008 | |
| WO | 2012176075 | 12/2012 | |

OTHER PUBLICATIONS

Supplementary European Search Report issued in European Application No. 14814317.5 dated Mar. 13, 2017 (7 pages).
Supplementary European Search Report issued in corresponding European Application No. 14813168.3 dated Mar. 2, 2017 (7 pages).
Supplementary European Search Report issued in European Application No. 14813298.8 dated Mar. 2, 2017 (6 pages).
International Search Report for International Application No. PCT/US2014/042894, dated Oct. 13, 2014 (3 pages).
Written Opinion for International Application No. PCT/US2014/042895, dated Oct. 10, 2014 (9 pages).
International Search Report for International Application No. PCT/US2014/042975, dated Oct. 22, 2014 (3 pages).
International Search Report for International Application No. PCT/US2014/042895, dated Oct. 12, 2014 (3 pages).

\* cited by examiner

HYBRID TEMPERATURE CONTROL SYSTEM AND METHOD

FIELD

This disclosure generally relates to a hybrid temperature control systems for controlling refrigeration to cool an air inside a cargo space and methods for using and/or configuring the hybrid temperature control system.

BACKGROUND

Existing transport refrigeration systems are used to cool containers, trailers, railcars or other transport units ("TU"). A temperature controlled TU (typically referred to as a "refrigerated transport unit") is commonly used to transport perishable items such as produce and meat products. In such a case, a transport refrigeration system ("TRS") can be used to condition the air inside a cargo space of the TU, thereby maintaining desired temperature and humidity during transportation or storage. Typically a transport refrigeration unit ("TRU") is attached to the TU to facilitate a heat exchange between the air inside the cargo space and the air outside of the TU.

SUMMARY

The embodiments described herein relate generally to a TRS. This disclosure generally relates to a hybrid temperature control system for controlling refrigeration to cool an air inside a cargo space and methods for using and configuring the hybrid temperature control system.

In particular, the embodiments described herein are directed to a device and method for cooling an air inside a cargo space using an eutectic device connected to at least two independent cooling fluid circuits. The eutectic device can be installed inside the cargo space of a TU.

In particular, the embodiments described herein are directed to a TRS for controlling refrigeration in a transport unit. One embodiment of the TRS for refrigeration of the transport unit comprises an eutectic device including an eutectic medium, a refrigerant circuit, and a cooling fluid circuit, wherein the refrigerant circuit and the cooling fluid circuit are independent from one another. The refrigerant circuit is connected to a TRU for directing a refrigerant through the refrigerant circuit for cooling an inside air of the transport unit and the eutectic medium. The cooling fluid circuit is thermally connected to the eutectic medium, and directs the cooling fluid to the eutectic medium, wherein the cooling fluid in the cooling fluid circuit cools the eutectic medium.

An embodiment of the TRS for controlling refrigeration in a transport unit comprises an eutectic device including an eutectic medium, and a cooling fluid circuit in thermal contact with the eutectic medium, the cooling fluid circuit configured to direct a cooling fluid to be in thermal contact with the eutectic medium. The embodiment also includes a refrigerant circuit connected to a TRU for directing a refrigerant from the TRU to the eutectic device for cooling the eutectic medium and an inside air of the transport unit.

In another embodiment of the TRS, the cooling fluid circuit includes a fluid inlet upstream from the eutectic medium, and a gas outlet downstream from the eutectic medium. A heat transfer from the eutectic medium to the cooling fluid flowing in the cooling fluid circuit transitions the cooling fluid from a liquid phase to a gas phase in the cooling fluid circuit, and the gas outlet removes the gas phase from the cooling fluid circuit.

In another embodiment of the TRS, a back pressure regulator is connected to the cooling fluid circuit upstream from the gas outlet.

Another embodiment of the TRS includes a temperature sensor connected to the cooling fluid circuit downstream from the eutectic medium, the temperature sensor detects a temperature of the cooling fluid in the cooling fluid circuit.

In an embodiment of the TRS, a cooling fluid tank is connected to the fluid inlet. The cooling fluid tank can be a stationary tank containing a cooling fluid. The cooling fluid tank can be a mobile tank containing the cooling fluid.

In another embodiment of the TRS, the cooling fluid is a cryogen, and the cryogen flowing through the cooling fluid circuit freezes the eutectic medium. In an embodiment of the TRS, the cryogen is carbon dioxide ($CO_2$). In another embodiment of the TRS, the cryogen is nitrogen ($N_2$).

An embodied method for cooling an eutectic device in a TRS, wherein the eutectic device contains an eutectic medium, a cooling fluid circuit is disposed in thermal contact with the eutectic medium, and a refrigerant circuit is disposed in thermal contact with the eutectic medium, includes directing a cooling fluid through the cooling fluid circuit, cooling the eutectic medium by transferring heat from the eutectic medium to the cooling fluid flowing through the cooling fluid circuit, and directing a refrigerant though the refrigerant circuit to cool the eutectic medium.

In another embodiment of the method, the cryogen circuit includes an evaporator coil, and the method includes transitioning the cooling fluid from a liquid phase to the gas phase within the evaporator coil.

In yet another embodiment, the method includes connecting a mobile cooling fluid tank to an inlet of the cooling fluid circuit to provide the cooling fluid to the cooling fluid circuit.

In an embodiment of the method, directing the cooling fluid includes directing a cryogen, and the method further comprises freezing the eutectic medium. In an embodiment of the method, directing the cryogen includes directing liquid carbon dioxide ($CO_2$). In another embodiment of the method, directing the cryogen includes directing liquid nitrogen ($N_2$).

In an embodiment of a method for installing an eutectic device to a TRS having a TRU comprises providing the eutectic device including an eutectic medium, and a cooling fluid circuit in thermal contact with the eutectic medium, wherein a cooling fluid flowing through the cooling fluid circuit is physically separated from the eutectic medium, and connecting the eutectic device to a refrigerant circuit of the TRU forming a thermal connection between the eutectic medium and the refrigerant circuit.

In another embodiment of the method for installing the eutectic device, the method includes connecting a mobile cooling fluid tank to an inlet of the cooling fluid circuit to provide the cooling fluid to the cooling fluid circuit.

In another embodiment of the method for installing the eutectic device, the method includes providing the cooling fluid.

In another embodiment of the method for installing the eutectic device, the providing the cooling fluid includes providing a cryogen. In another embodiment of the method for installing the eutectic device, providing the cryogen includes providing liquid carbon dioxide ($CO_2$). In another embodiment of the method for installing the eutectic device, providing the cryogen includes providing liquid nitrogen ($N_2$).

BRIEF DESCRIPTION OF THE DRAWINGS

Referring now to the drawings in which like reference numbers represent corresponding parts throughout.

DETAILED DESCRIPTION

The embodiments described herein are directed to a TRS. More particularly, the embodiments relate to a hybrid temperature control system for controlling refrigeration to cool an air inside a cargo space.

References are made to the accompanying drawings that form a part hereof, and in which is shown by way of illustration of the embodiments in which the methods and systems described herein may be practiced. The term "refrigerated transport unit" generally refers to, for example, a conditioned trailer, container, railcars or other type of transport unit, etc. The term "transport refrigeration system" or "TRS" refers to a refrigeration system for controlling the refrigeration of a conditioned space of the refrigerated transport unit.

It will be appreciated that the embodiments described herein may be used in any suitable transport unit such as a ship board container, an air cargo cabin, an over the road truck cabin, etc.

Figure 1:
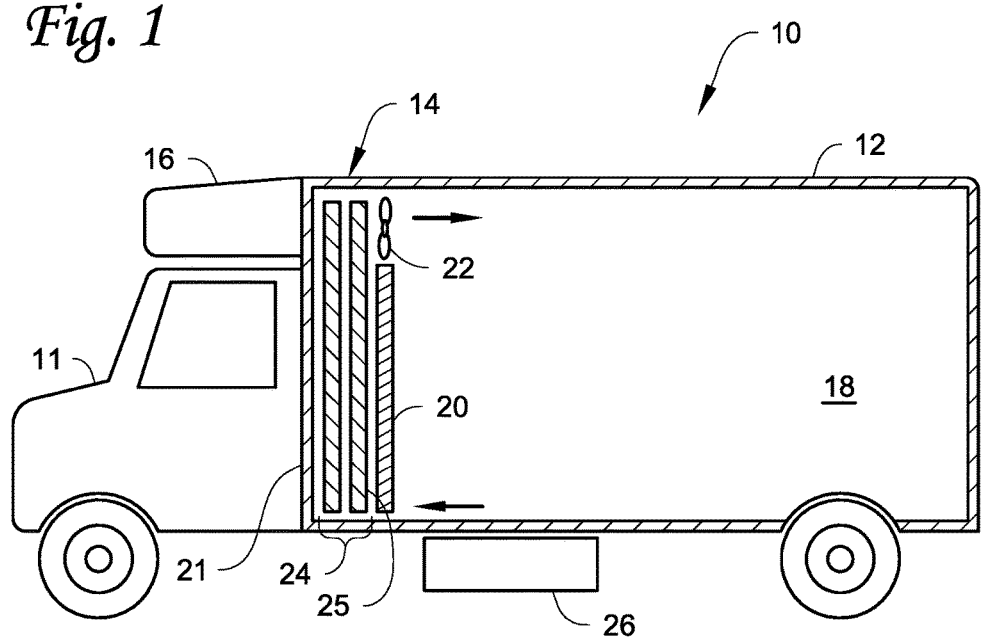
FIG. 1 illustrates a side cutaway view of a refrigerated transport unit attached to a tractor, according to an embodiment.

FIG. 1 illustrates a side view of a refrigerated transport unit 10 attached to a tractor 11. The refrigerated transport unit 10 includes a transport unit 12 and a TRS 14. The TRS 14 includes a TRU 16 and an eutectic device 24 that are configured to create a conditioned air flow from a front side to a rear side of the cargo space 18. The eutectic device 24 can be positioned in front of a bulkhead 20 which separates the eutectic device 24 from the rest of the cargo space 18. Accordingly, the eutectic device 24 can be positioned between a front wall 21 of the transport unit 12 and the bulkhead 20.

In some embodiments, the eutectic device 24 can operate without a compressor unit and/or a condensing unit. The term condensing unit is used herein to describe a separate and independent device from a condenser of the mechanical refrigeration system. That is, the mechanical refrigeration system includes the condenser. The condensing unit is a separate and independent device from the mechanical refrigeration system. Accordingly, the eutectic device 24 which can operate without the condensing unit does not preclude the eutectic device 24 being operable with the mechanical refrigeration system (which includes the condenser).

The TRU 16 houses various refrigeration components, such as an evaporator blower, condenser blowers, an evaporator coil, condenser coils, etc., and provides a thermal barrier between the front side (e.g., the side where the condenser unit is located) of the cargo space 18 and the rear side (e.g., the side where the evaporator unit is located) of the cargo space 18.

A blower fan 22 of the TRS 14 can provide additional air flow for the cooling of the cargo space 18. The blower fan 22 may be positioned so that the cooled air is blown towards the back of the cargo space 18. In other embodiments, the blower fan 22 may be positioned so that the cooled air is blown towards the front of the cargo space 18.

The eutectic device 24 can be cooled by the TRU 16. This cooling of the eutectic device 24 can be by direct cooling by thermal contact between the evaporator coil of the TRU 16 and the eutectic device 24 and/or a cooling refrigerant circuit from the TRU 16 to the eutectic device 24. By indirect cooling by cooled air from the TRU 16 cooling the eutectic device 24 as the cooled air flows from the TRU 16 over the eutectic device 24 towards the rear side of the cargo space 18.

The TRS 14 is also configured to transfer heat between the cargo space 18 and the eutectic device 24. The eutectic device 24 is configured for controlling the temperature in the cargo space 18. FIG. 1 shows the eutectic device 24 positioned near the front wall 21 of the transport unit 12, in front of the bulkhead 20 (e.g., between the front wall 21 and the bulkhead 20 in the container). The blower fan 22 can blow air cooled by the eutectic device 24 towards rear of the cargo space 18.

The eutectic device 24 includes cold plates 25. However, the eutectic device 24 can include one or more cold plates 25, tubes, or combinations thereof. The eutectic device 24 contains an eutectic medium. The eutectic medium can become solid when cooled (e.g., freezes) and then absorbs heat to transition to a liquid. The eutectic medium becomes solid when cooled (e.g., freezes) and then absorbs heat to transition to a liquid. The eutectic medium can include, for example, sodium chloride solution, calcium chloride solution, etc.

FIG. 1 shows a cooling fluid tank 26. The cooling fluid tank 26 can be connected to the eutectic device 24 to direct a cooling fluid, such as a cryogen, from the cooling fluid tank 26 to the eutectic device 24. Optionally, the cooling fluid tank 26 can be connected to the refrigerated transport unit 10 (e.g., the transport unit 12 and/or the tractor 11), so that the cooling fluid tank 26 can provide the cooling fluid to the eutectic device 24 for cooling the eutectic medium as desired or needed, while in transit or when away from a station. In one embodiment, the cooling fluid tank 26 is connected to the refrigerated transport unit 10, so that the cooling fluid tank 26 is mobile with the refrigerated transport unit 10. In another embodiment, the cooling fluid tank 26 is not connected to the refrigerated transport unit 10, so that the cooling fluid tank 26 is not mobile with the refrigerated transport unit 10.

After the eutectic medium has been frozen, the TRS 14 can cool the cargo space 18 without generating any substantial noise, or any noise. Thus, advantageously, the eutectic device 24 can provide near silent cooling to the cargo space 18. Additionally, the TRS 14 having the eutectic device 24 can cool the cargo space 18 when the TRU 16 is turned off, so that the cooling of the cargo space 18 can be provided with no power, or very little power (e.g., low amount of power for running the blower fan 22). Further, the TRS 14 with the eutectic device 24 can cool the cargo space 18 faster than a conventional device that has only a conventional TRU.

Figure 2:
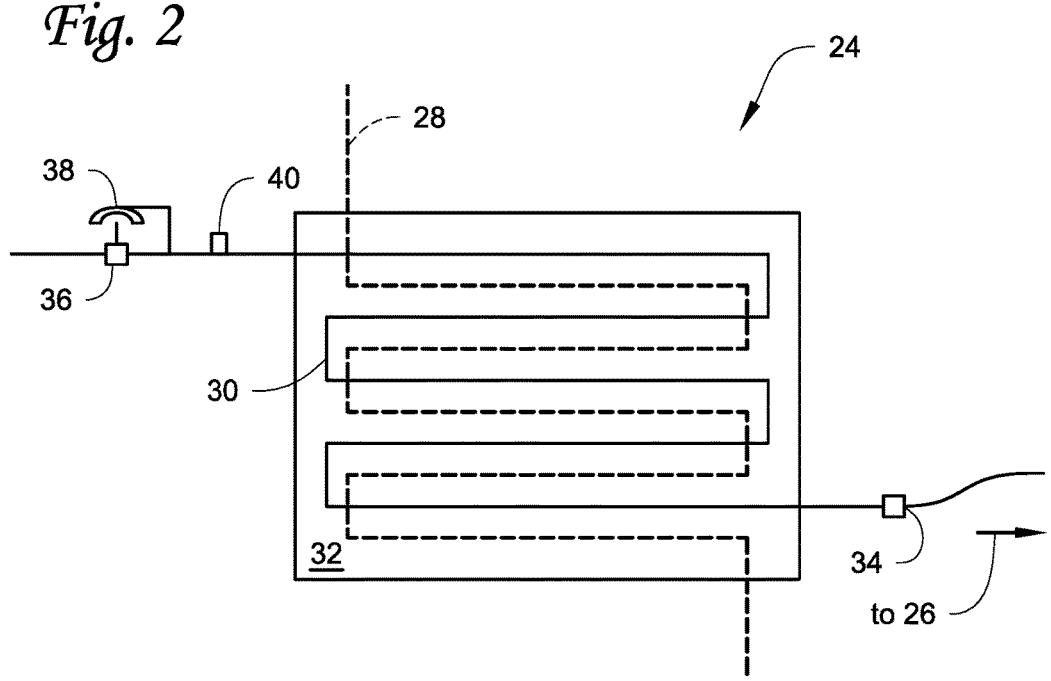
FIG. 2 illustrates an eutectic device for a TRS according to one embodiment.

FIG. 2 shows an embodiment of the eutectic device 24. The eutectic device 24 includes a refrigerant fluid circuit 28 and a cooling fluid circuit 30.

The eutectic device 24 contains the eutectic medium 32 therein. The eutectic medium 32 becomes solid when cooled (e.g., freezes) and then absorbs heat to transition to the liquid phase.

The refrigerant fluid circuit 28 of the eutectic device 24 can be, for example, a part of the refrigerant fluid circuit connected to the TRU, for example, an evaporator coil that direct the refrigerant fluid from the TRU to the TRU's condenser unit. Alternatively, the refrigerant fluid circuit 28 can be a cooling line separate from the evaporator coil running from the TRU for cooling the eutectic device 24 with the TRU. The refrigerant fluid running through the refrigerant fluid circuit 28 absorbs heat from the eutectic device 24 (e.g., from the plates or tubes and/or from the eutectic medium 32) to cool and/or maintain the temperature of the eutectic device 24.

The eutectic device 24 includes the cooling fluid circuit 30 for directing a cooling fluid therethrough. The cooling fluid circuit 30 has a cooling fluid inlet 34 and a gas outlet 36. For example, the cooling fluid inlet 34 has a connector for connecting to the cooling fluid tank (e.g., 26 shown in FIG. 1).

The cooling fluid circuit 30 directs the cooling fluid to flow therethrough without physically mixing with the eutectic medium 32. The cooling fluid circuit 30 allows the cooling fluid to have thermal contact with the eutectic medium 32, so that heat can transfer from the eutectic medium 32 to the cooling fluid flowing through the cooling fluid circuit 30. When heat is transferred from the eutectic medium 32 to the cooling fluid, the eutectic medium 32 becomes frozen and the cooling fluid transitions from a liquid phase to a gas phase.

Thus, when the cooling fluid is introduced into the cooling fluid circuit 30 via the cooling fluid inlet 34, the cooling fluid is in a liquid phase. When the cooling fluid leaves the cooling fluid circuit 30 via the gas outlet 36, the cooling fluid is in a gas phase. The gas outlet 36 is disposed outside the container, so that the cooling fluid gas does not enter the cargo space (e.g., 18 shown in FIG. 1).

In an embodiment, the cooling fluid circuit 30 includes an evaporator coil, wherein transitioning the liquid phase of the cooling fluid to the gas phase of the cooling fluid occurs at the evaporator coil.

In an embodiment, the eutectic device 24 uses a cryogen as the cooling fluid to freeze the eutectic medium 32. Examples of the cryogen are, but are not limited to, carbon dioxide ($CO_2$) and nitrogen ($N_2$). Thus, when the cryogen is introduced into the cooling fluid circuit 30 via the cooling fluid inlet 34, the cryogen is in a liquid phase, such as liquid carbon dioxide or liquid nitrogen. When the cryogen leaves the cooling fluid circuit 30 via the gas outlet 36, the cryogen is in a gas phase, such as carbon dioxide gas or nitrogen gas.

The frozen eutectic medium 32 then transfers heat to a plate or a tube of the eutectic device, which cools the air inside the cargo space of the container.

The cooling fluid circuit 30 can also include a back pressure regulator 38 at the gas outlet 36 that prevents back pressure issues. For example, when the cryogen is $CO_2$, the back pressure regulator 38 prevents pressure from dropping too low, which would cause dry ice (solid phase of $CO_2$) formation. Dry ice can block the flow of the cryogen and stop the cooling process. This dry ice formation issue does not exist when the cryogen is $N_2$, so back pressure regulator 38 is not needed for embodiments that use $N_2$ as the cryogen. Additionally, the cooling fluid circuit 30 can also include a sensor 40 that can detect a condition of the cooling fluid circuit 30, wherein the condition can be, but not limited to, temperature.

In an embodiment, the cooling fluid circuit 30 can operate without a compressor unit and/or a condensing unit. In an embodiment, the cooling fluid circuit 30 does not include a blower.

An embodiment of a method for installing the eutectic device 24 includes providing the eutectic device 24 containing the eutectic medium 32, and the cooling fluid circuit 30, and then connecting the eutectic device 24 to the TRU 16. The method can further include connecting a stationary cooling fluid tank to the cooling fluid inlet 34 to provide the cooling fluid to the cooling fluid circuit 30. The method can further include connecting a mobile cooling fluid tank (e.g., 26 shown in FIG. 1) to the cooling fluid inlet 34 to provide the cooling fluid to the cooling fluid circuit 30.

Aspects

It is noted that any of the features of aspects 1-8, 9-14 and 15-20 can be combined.

Aspect 1. A transport refrigeration system (TRS) for controlling refrigeration in a transport unit, comprising:
an eutectic device including an eutectic medium, and a cooling fluid circuit in thermal contact with the eutectic medium, the cooling fluid circuit configured to direct a cooling fluid to be in thermal contact with the eutectic medium; and
a refrigerant circuit connected to a transport refrigeration unit (TRU) for directing a refrigerant from the TRU to the eutectic device for cooling the eutectic medium and an inside air of the transport unit.

Aspect 2. The transport refrigeration system (TRS) according to aspect 1, wherein the cooling fluid circuit includes a fluid inlet upstream from the eutectic medium, and a gas outlet downstream from the eutectic medium,
a heat transfer from the eutectic medium to the cooling fluid flowing in the cooling fluid circuit transitions the cooling fluid from a liquid phase to a gas phase in the cooling fluid circuit, and the gas outlet removes the gas phase from the cooling fluid circuit.

Aspect 3. The transport refrigeration system (TRS) according to any of the aspects 1-2, further comprising a back pressure regulator connected to the cooling fluid circuit upstream from the gas outlet.

Aspect 4. The transport refrigeration system (TRS) according to any of the aspects 1-3, further comprising a temperature sensor connected to the cooling fluid circuit downstream from the eutectic medium, the temperature sensor configured to detect a temperature of the cooling fluid in the cooling fluid circuit.

Aspect 5. The transport refrigeration system (TRS) according to any of the aspects 1-4, further comprising a cooling fluid tank connected to the fluid inlet.

Aspect 6. The transport refrigeration system (TRS) according to any of the aspects 1-5, wherein the cooling fluid is a cryogen, and the cryogen flowing through the cooling fluid circuit freezes the eutectic medium.

Aspect 7. The transport refrigeration system (TRS) according to any of the aspects 1-6, wherein the cryogen includes carbon dioxide ($CO_2$).

Aspect 8. The transport refrigeration system (TRS) according to any of the aspects 1-7, wherein the cryogen includes nitrogen ($N_2$).

Aspect 9. A method for cooling an eutectic device in a transport refrigeration system (TRS), the eutectic device including an eutectic medium, a cooling fluid circuit disposed and in thermal contact with the eutectic medium, and a refrigerant circuit disposed in thermal contact with the eutectic medium, the method comprising:
directing a cooling fluid through the cooling fluid circuit;
cooling the eutectic medium by transferring heat from the eutectic medium to the cooling fluid flowing through the cooling fluid circuit;
directing a refrigerant though the refrigerant circuit to cool the eutectic medium.

Aspect 10. The method according to aspect 9, wherein the cryogen circuit includes an evaporator coil, the method further comprising:

transitioning the cooling fluid from a liquid phase to the gas phase within the evaporator coil.

Aspect 11. The method according to any of the aspects 9-10, further comprising:
directing the cooling fluid from a cooling fluid tank to an inlet of the cooling fluid circuit to provide the cooling fluid to the cooling fluid circuit.

Aspect 12. The method according to any of the aspects 9-11, wherein directing the cooling fluid includes directing a cryogen, and the method further comprises freezing the eutectic medium.

Aspect 13. The method according to any of the aspects 9-12, wherein directing the cryogen includes directing liquid carbon dioxide ($CO_2$).

Aspect 14. The method according to any of the aspects 9-13, wherein directing the cryogen includes directing liquid nitrogen ($N_2$).

Aspect 15. A method for installing an eutectic device to a transport refrigeration system (TRS) having a transport refrigeration unit (TRU), comprising:
providing the eutectic device including an eutectic medium, and a cooling fluid circuit in thermal contact with the eutectic medium, wherein a cooling fluid flowing through the cooling fluid circuit is physically separated from the eutectic medium; and
connecting the eutectic device to a refrigerant circuit of the TRU forming a thermal connection between the eutectic medium and the refrigerant circuit.

Aspect 16. The method according to aspect 15, further comprising:
connecting a cooling fluid tank to an inlet of the cooling fluid circuit to provide the cooling fluid to the cooling fluid circuit.

Aspect 17. The method according to any of the aspects 15-16, further comprising:
providing the cooling fluid.

Aspect 18. The method according to any of the aspects 15-17, wherein the providing the cooling fluid includes providing a cryogen.

Aspect 19. The method according to any of the aspects 15-18, wherein providing the cryogen includes providing liquid carbon dioxide ($CO_2$).

Aspect 20. The method according to any of the aspects 15-19, wherein providing the cryogen includes providing liquid nitrogen ($N_2$).

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What is claimed is:

1. A transport refrigeration system (TRS) for controlling refrigeration in a transport unit, comprising:
an eutectic device including an eutectic medium, and a cooling fluid circuit in thermal contact with the eutectic medium, the cooling fluid circuit configured to direct a cooling fluid to be in thermal contact with the eutectic medium, wherein the cooling fluid circuit passes through the eutectic device to allow the cooling fluid to be in thermal contact with the eutectic medium without physically mixing with the eutectic medium; and
a refrigerant circuit connected to a transport refrigeration unit (TRU) configured to direct a refrigerant from the TRU to the eutectic device for cooling the eutectic medium and an inside air of the transport unit, wherein the refrigerant circuit passes through the eutectic device to allow the refrigerant to be in thermal contact with the eutectic medium;
wherein the cooling fluid circuit is separate from the refrigerant circuit within the eutectic device, and
wherein the eutectic device is configured to be directly cooled via the refrigerant circuit and the cooling circuit and is configured to be indirectly cooled via cooled air flowing from the TRU over the eutectic device.

2. The transport refrigeration system (TRS) according to claim 1, wherein the cooling fluid circuit includes a fluid inlet upstream from the eutectic medium, and a gas outlet downstream from the eutectic medium,
wherein the cooling fluid circuit is configured to facilitate a heat transfer from the eutectic medium to the cooling fluid flowing in the cooling fluid circuit so as to transition the cooling fluid from a liquid phase to a gas phase in the cooling fluid circuit, and the gas outlet is configured to remove the gas phase from the cooling fluid circuit.

3. The transport refrigeration system (TRS) according to claim 2, further comprising a back pressure regulator connected to the cooling fluid circuit upstream from the gas outlet.

4. The transport refrigeration system (TRS) according to claim 2, further comprising a temperature sensor connected to the cooling fluid circuit downstream from the eutectic medium, the temperature sensor configured to detect a temperature of the cooling fluid in the cooling fluid circuit.

5. The transport refrigeration system (TRS) according to claim 2, further comprising a cooling fluid tank connected to the fluid inlet.

6. The transport refrigeration system (TRS) according to claim 5, wherein the cooling fluid is a cryogen, and the cryogen flowing through the cooling fluid circuit freezes the eutectic medium.

7. The transport refrigeration system (TRS) according to claim 6, wherein the cryogen includes carbon dioxide ($CO_2$).

8. The transport refrigeration system (TRS) according to claim 6, wherein the cryogen includes nitrogen ($N_2$).

9. A method for cooling an eutectic device in a transport refrigeration system (TRS), the eutectic device including an eutectic medium, a cooling fluid circuit disposed and in thermal contact with the eutectic medium, and a refrigerant circuit connected to a transport refrigeration unit (TRU) such that the refrigerant circuit is disposed in thermal contact with the eutectic medium, wherein the cooling fluid circuit is separate from the refrigerant circuit within the eutectic device, the method comprising:
directing a cooling fluid through the cooling fluid circuit, wherein the cooling fluid circuit passes through the eutectic device to allow the cooling fluid to be in thermal contact with the eutectic medium without physically mixing with the eutectic medium;
cooling the eutectic medium by transferring heat from the eutectic medium to the cooling fluid flowing through the cooling fluid circuit;
directing a refrigerant though the refrigerant circuit to cool the eutectic medium, wherein the refrigerant circuit passes through the eutectic device to allow the refrigerant to be in thermal contact with the eutectic medium; and
indirectly cooling the eutectic device via a cooled air flowing from the TRU over the eutectic device.

10. The method according to claim 9, wherein the cooling fluid circuit includes an evaporator coil, the method further comprising:
   transitioning the cooling fluid from a liquid phase to the gas phase within the evaporator coil.

11. The method according to claim 9, further comprising:
   directing the cooling fluid from a cooling fluid tank to an inlet of the cooling fluid circuit to provide the cooling fluid to the cooling fluid circuit.

12. The method according to claim 9, wherein directing the cooling fluid includes directing a cryogen, and the method further comprises freezing the eutectic medium.

13. The method according to claim 12, wherein directing the cryogen includes directing liquid carbon dioxide ($CO_2$).

14. The method according to claim 12, wherein directing the cryogen includes directing liquid nitrogen ($N_2$).

15. A method for installing an eutectic device to a transport refrigeration system (TRS) having a transport refrigerant unit (TRU), comprising:
   providing the eutectic device including an eutectic medium, and a cooling fluid circuit in thermal contact with the eutectic medium, wherein the cooling fluid circuit passes through the eutectic device to allow the cooling fluid to be in thermal contact with the eutectic medium without physically mixing with the eutectic medium, and wherein a cooling fluid flowing through the cooling fluid circuit is physically separated from the eutectic medium; and
   connecting the eutectic device to a refrigerant circuit of the TRU forming a thermal connection between the eutectic medium and the refrigerant circuit, wherein the refrigerant circuit passes through the eutectic device to allow a refrigerant to be in thermal contact with the eutectic medium,
   wherein the cooling fluid circuit is separate from the refrigerant circuit within the eutectic device, and
   wherein the eutectic device is disposed in relation to the TRU such that the eutectic device is directly cooled via the refrigerant circuit and the cooling circuit and is indirectly cooled via cooled air flowing from the TRU over the eutectic device.

16. The method according to claim 15, further comprising:
   connecting a cooling fluid tank to an inlet of the cooling fluid circuit to provide the cooling fluid to the cooling fluid circuit.

17. The method according to claim 15, further comprising:
   providing the cooling fluid.

18. The method according to claim 17, wherein the providing the cooling fluid includes providing a cryogen.

19. The method according to claim 18, wherein providing the cryogen includes providing liquid carbon dioxide ($CO_2$).

20. The method according to claim 18, wherein providing the cryogen includes providing liquid nitrogen ($N_2$).

* * * * *